United States Patent
Aurongzeb et al.

(10) Patent No.: US 10,055,186 B2
(45) Date of Patent: Aug. 21, 2018

(54) MITIGATION OF IMAGE DEGRADATION IN DISPLAYS

(71) Applicant: Dell Products, LP, Round Rock, TX (US)

(72) Inventors: Deeder M. Aurongzeb, Austin, TX (US); Benedict Tiong Chee Tay, Singapore (SG); Erin K. Walline, Pflugerville, TX (US)

(73) Assignee: Dell Products, LP, Round Rock, TX (US)

( * ) Notice: Subject to any disclaimer, the term of this patent is extended or adjusted under 35 U.S.C. 154(b) by 23 days.

(21) Appl. No.: 15/170,721

(22) Filed: Jun. 1, 2016

(65) Prior Publication Data

US 2017/0352303 A1    Dec. 7, 2017

(51) Int. Cl.
| | |
|---|---|
| *G06T 11/00* | (2006.01) |
| *G06T 11/60* | (2006.01) |
| *G06F 3/048* | (2013.01) |
| *G06F 3/14* | (2006.01) |
| *G09G 3/20* | (2006.01) |
| *G09G 5/02* | (2006.01) |
| *G09G 5/14* | (2006.01) |
| *G09G 5/373* | (2006.01) |

(52) U.S. Cl.
CPC ............. *G06F 3/1423* (2013.01); *G09G 5/14* (2013.01); *G09G 5/373* (2013.01); *G09G 2340/0407* (2013.01)

(58) Field of Classification Search
CPC combination set(s) only.
See application file for complete search history.

(56) References Cited

U.S. PATENT DOCUMENTS

| | | | |
|---|---|---|---|
| 7,397,485 B2 | 7/2008 | Miller et al. | |
| 8,077,123 B2 | 12/2011 | Naugler, Jr. | |
| 8,793,620 B2 | 7/2014 | Stafford | |
| 8,803,800 B2 | 8/2014 | Zambrano et al. | |
| 8,843,857 B2 | 9/2014 | Berkes et al. | |
| 9,313,319 B2 | 4/2016 | Aurongzeb et al. | |
| 2005/0216862 A1* | 9/2005 | Shinohara | H04N 5/23293 715/825 |
| 2005/0251590 A1* | 11/2005 | Ferguson | H04N 1/00204 710/8 |
| 2010/0149223 A1 | 6/2010 | Betts-LaCroix | |
| 2010/0185986 A1* | 7/2010 | Quintanilla | G06F 3/04817 715/835 |
| 2010/0271289 A1* | 10/2010 | Goodart | G09G 5/006 345/3.1 |

(Continued)

*Primary Examiner* — Wesner Sajous
(74) *Attorney, Agent, or Firm* — Singh Law, PLLC; Ranjeev Singh

(57) ABSTRACT

Systems and methods for mitigating image degradation in displays are provided. In one example, the present disclosure relates to an information handling system comprising a display policy related to a display, where the display policy provides information concerning: (1) at least one icon for display on the display, and (2) a schedule for changing a size of the at least one icon over a period of time. The system may further include an image data storage configured to store image data corresponding to the at least one icon for the display. The system may further include an image data adjuster configured to adjust the image data corresponding to the at least one icon based on the display policy.

18 Claims, 7 Drawing Sheets

(56) References Cited

U.S. PATENT DOCUMENTS

| | | | |
|---|---|---|---|
| 2010/0306418 A1* | 12/2010 | Anson | G06F 9/4411 710/8 |
| 2011/0080442 A1 | 4/2011 | Ghosh et al. | |
| 2012/0098870 A1 | 4/2012 | Bamhoefer et al. | |
| 2013/0232331 A1* | 9/2013 | Farhan | G06F 11/3006 713/100 |
| 2013/0286055 A1 | 10/2013 | Nathan et al. | |
| 2015/0009107 A1 | 1/2015 | Park et al. | |
| 2015/0054736 A1* | 2/2015 | Brancato | G06F 3/015 345/156 |
| 2015/0092520 A1 | 4/2015 | Robison et al. | |
| 2015/0097876 A1 | 4/2015 | Park et al. | |
| 2015/0279328 A1* | 10/2015 | Ong | G09G 5/14 345/660 |
| 2016/0133221 A1* | 5/2016 | Peana | G09G 5/10 345/156 |
| 2016/0314727 A1* | 10/2016 | Bui | G06T 7/80 |
| 2017/0177166 A1* | 6/2017 | Kockan | G06F 3/0481 |

* cited by examiner

MITIGATION OF IMAGE DEGRADATION IN DISPLAYS

TECHNICAL FIELD

The present disclosure relates to display systems and methods and in particular to mitigation of image degradation in displays.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include displays for displaying information to a user. Many types of displays use materials that may degrade over time because of usage. The degradation of the materials in the displays may shorten their lifetime significantly. In addition, because of the degradation of the materials in the displays, the images provided by the displays may suffer from problems, such as image sticking.

SUMMARY

In one example, the present disclosure relates to an information handling system (IHS) comprising a display policy related to a display, where the display policy provides information concerning: (1) at least one icon for display on the display, and (2) a schedule for changing a size of the at least one icon over a period of time. The IHS may further include an image data storage configured to store image data corresponding to the at least one icon for the display. The IHS may further include an image data adjuster configured to adjust the image data corresponding to the at least one icon based on the display policy.

In another aspect, the present disclosure relates to a method comprising providing information concerning at least one contextual metric related to a display. The method may further include detecting at least one value corresponding to the at least one contextual metric related to the display. The method may further include storing image data for the display in an image data storage. The method may further include adjusting the image data based on the at least one value corresponding to the at least one contextual metric related to the display.

In yet another aspect, the present disclosure relates to an information handling system (IHS) comprising a first display and a second display. The IHS may further include a display policy related to the first display and the second display, where the display policy provides information concerning use of the first display and the second display. The IHS may further include a detector configured to generate usage data concerning use of the first display and use of the second display. The IHS may further include a controller configured to change at least one parameter associated with at least one of the first display or the second display based on both the display policy and the usage data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
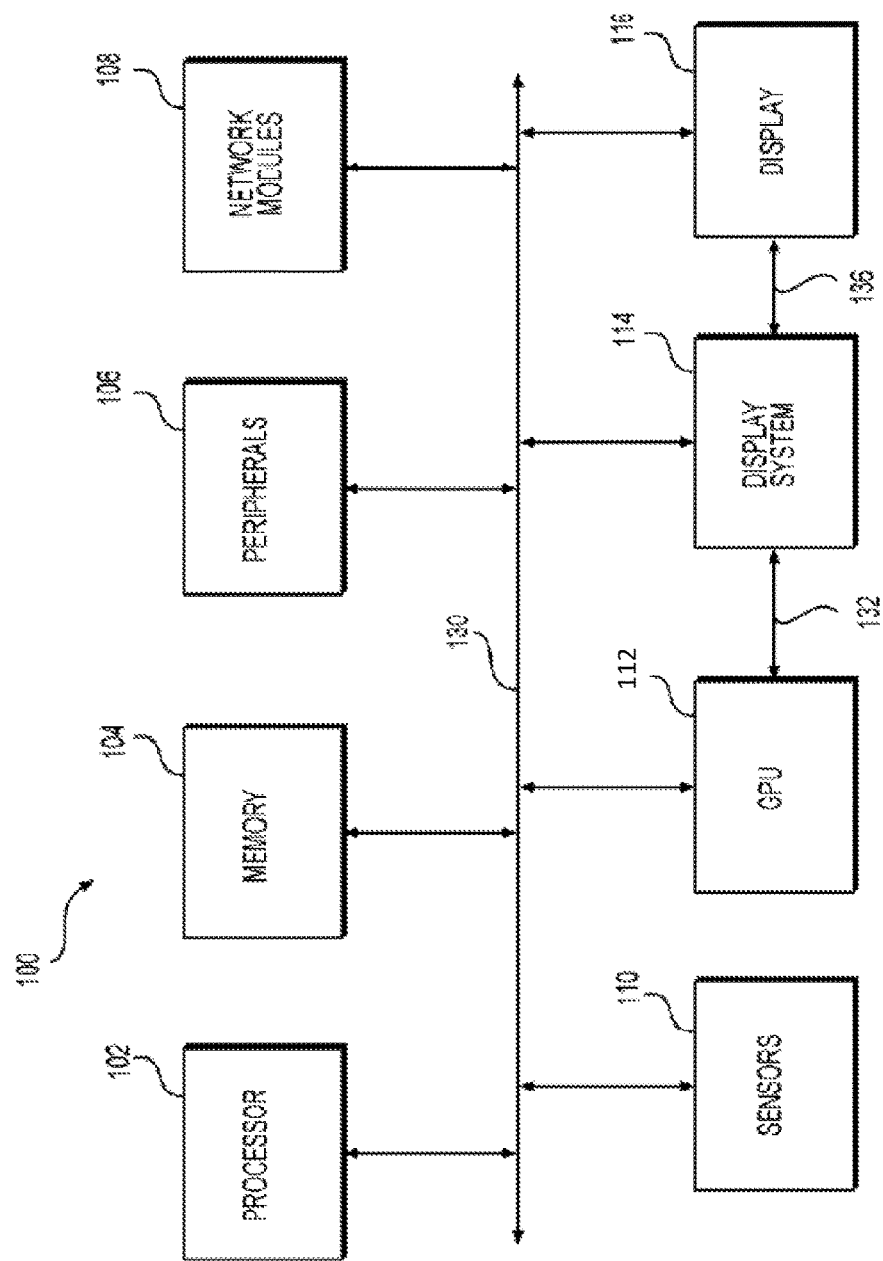
FIG. 1 is a block diagram of an information handling system in accordance with one example.

Examples described in this disclosure relate to mitigation of image degradation in displays. To display an image, pixels corresponding to red, blue, and green colors are processed by a pixel controller. The color, intensity, or other values corresponding to each of the pixels for display determine the image on the display. In certain types of displays, such as organic light emitting diode (OLED) displays, each pixel is driven individually. In other words, each pixel is provided a specific voltage or current value that determines the amount of emissions of photons from each pixel. Blue pixels have the highest energy density and the lowest wavelength among the three primary colors (red, green, and blue). As a result, blue pixels may degrade faster than the red or the green pixels. This may cause problems, such as image sticking. Image sticking relates to image retention in certain portions of a display when a fixed pattern is displayed over a prolonged period of time on the display. Such image retention may result in shaded areas in certain portions of the display. As an example, a desktop icon that is always displayed at a particular location on the display may cause degradation of the image at that location. Such image degradation occurs from use over a prolonged period of time, such as from use over a few thousand hours. Not only the amount of use, but also the type of use may cause image degradation. As an example, a display that is used to display higher resolution images will degrade faster than a display that is used to display lower resolution images.

Displays, such as OLED displays, may be incorporated as part of an information handling system. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 is a block diagram of an information handling system (IHS) 100 in accordance with one example. IHS 100 may include a processor 102, memory 104, peripherals 106, network modules 108, sensors 110, GPU 112, display system 114 and display 116. In one example, these components may be interconnected via a bus 130. GPU 112 may be connected via another bus 132 to display system 114. Display system 114 may further be connected via another bus 136 to display 116. Processor 102 may include multiple processors. Memory 104 may include memory, such as DRAM, Flash memory, or other types of memory. Peripherals 106 may include devices, such as input/output devices (e.g., a mouse, a keyboard, a printer, or other such devices). Network modules 108 may include network controllers for interfacing with various wired or wireless protocols, such as Wi-Fi, Ethernet, Bluetooth, or other such protocols. Sensors 110 may include various types of sensors, such as presence sensors, cameras, touch sensors, or other types of sensors. Presence sensor may be an infrared sensor or an ultrasound sensor. GPU 112 may include a graphics processing unit or multiple such units. Display system 114 may include components, such as a pixel controller, a display controller, an image storage, and other components for enabling the display of image data on display 116. Display 116 may be one or more displays, including LCD, LED, OLED, or other types of displays. Although FIG. 1 shows a certain number of components of IHS 100 arranged in a certain manner, there could be more or fewer number of components arranged differently.

Figure 2:
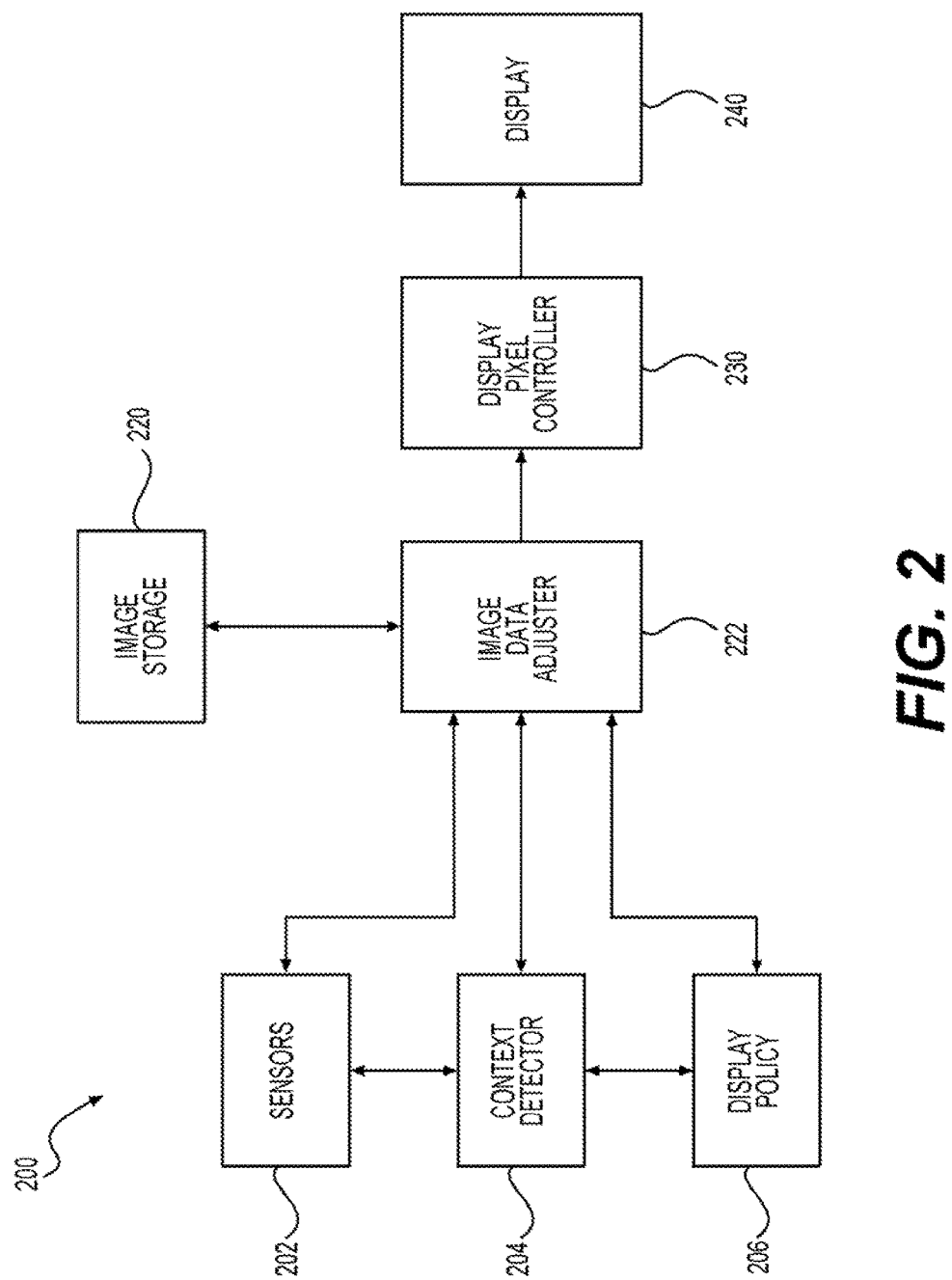
FIG. 2 is a block diagram of a display system in accordance with one example.

FIG. 2 is a block diagram of a display system 200 in accordance with one example. Display system 200 may include sensors 202, a context detector 204, a display policy 206, an image storage 220, an image data adjuster 222, a display pixel controller 230, and a display 240. Although display 240 is shown as part of display system 200, in one example, it may not be part of display system 200; instead, display 240 may be coupled to the display system. Sensors 202 may include various types of sensors, such as presence sensors, cameras, touch sensors, or other types of sensors. Presence sensor may be an infrared sensor or an ultrasound sensor. Context detector 204 may include control logic and/or associated software to detect at least one value corresponding to at least one contextual metric related to display 240. By way of example, contextual metrics include, but are not limited to, a user type, a user role, a type of environment associated with the use, or a usage pattern associated with display 240. The user type or the user role may be related to the user's profile. As an example, a physician, who uses a high-resolution image display application to view patient images may be one type of a user. Another type of user of the same display may be a physician's assistant, who uses a data-entry application to manage the patient's health records. In one example, the type of environment associated with the use may relate to the type of office where the display is located. Thus, one environment may be a back office and another environment may be a radiology practice office. In one example, context detector 204 may detect the office environment based on data provided by the sensors 202 or based on display policy 206. In one example, context detector 204 may detect the user type based on the login information associated with a user. Thus, the login information may include information concerning the type of the user. The usage pattern may also relate to the usage of the type of software or applications used by a user of display 240.

Display policy 206 may include or provide a display policy associated with display 240. An operating system associated with an information handling system comprising display 240 may access display policy 206. Display policy 206 may also interface with the operating system and other parts of display system 200 via an application programming framework. Display policy 206 may be stored as part of the BIOS for the information handling system 100. Alternatively, display policy 206 may be stored in a memory associated with display 240. The display policy may provide information concerning at least one contextual metric related to the display. The contextual metrics and corresponding values may be any one of the contextual metrics discussed earlier or other metrics. Furthermore, the display policy may provide information concerning the usage level of a user. The usage level may correspond to a high usage level or a low usage level. The usage level may be more granular than high and low. In one example, sensors 202 associated with display system 200 may track the different user's behavior and classify each of the users in the appropriate usage level category. A combination of a 3-D camera or another type of camera and a presence sensor may be used to track the users. In addition, display policy may provide information concerning variation in at least one parameter associated with the display. As an example, the color intensity index associated with the display images may be stored as part of the display policy as well. The color intensity index may be a relative value of the intensity of the color for use by display pixel controller 230. A value of 255 for each of the red, green, and blue colors may represent full saturation for these color values. Table 1 below shows one example format for storing a display policy associated with display 240. Although Table 1 shows a certain number of rows and columns organized in a certain manner, the display policy 206 may store such information in a different manner and in other formats.

| User Type | Applications | Usage Level | Color Intensity Index |
|---|---|---|---|
| Executive (Windows) | Adobe | Low | 232 |
| Executive (Mac OS) | Keynote, Desktop | Low | 237 |
| Industrial Designer | Solidworks | High | 235 |
| CGI Producer | Illustrator | High | 211 |
| Animation Producer | Maya, IE | High | 235 |

With continued reference to FIG. 2, in one example, display policy 206 may also be an application that interacts with the BIOS, the operating system, and any other display policy related information to create a display policy table, such as the one shown in Table 1. In addition, display policy 206 may be updated automatically based on any changes in the parameters related to the display policy, including the usage level. Thus, sensors associated with display system 200 may monitor usage level and may provide usage data that can be used to automatically update the display policy.

Image data adjuster 222 may include control logic and/or associated software to adjust image data based on the display policy. Image data may be stored in image storage 220. As an example, image data adjuster may, before providing the image data to display 240, adjust the image data based on at least one value corresponding to at least one contextual metric related to the display. In this example, the brightness of display 240 may be changed based on whether the user type is an industrial designer or whether the user type is an executive, as per the display policy. Display pixel controller 230 may: (1) provide values corresponding to the red pixels to display 240, (2) provide values corresponding to green pixels to display 240, and (3) provide values corresponding to the blue pixels to display 240. Image data adjuster 222 may be configured to at least: (1) modify at least one of the values corresponding to the red pixels, (2) modify at least one of the values corresponding to the green pixels, or (3) modify at least one of the values corresponding to the blue pixels to adjust the image data based on the at least one value corresponding to the at least one contextual metric related to the display. In another example, image data adjuster may be configured to modify at least one of the values corresponding only to the blue pixels to adjust the image data based on the at least one value corresponding to the at least one contextual metric related to the display. In another example, display 240 may be an organic light emitting display (OLED) and image data adjuster 222 may be configured to modify at least one of the values corresponding to only blue pixels to adjust the image data based on the display policy.

With continued reference to FIG. 2, a display pixel controller 230 may provide the values corresponding to the red, green, and blue pixels to display 240. These values may include values corresponding to an intensity, brightness, contrast, color, or values related to the other parameters associated with the pixels. Display pixel controller 230 may use various types of techniques to control the various values associated with the parameters, including pulse-width modulation or other such techniques. Display pixel controller 230 may be configured to control voltage or current values associated with each pixel as well.

Figure 3:
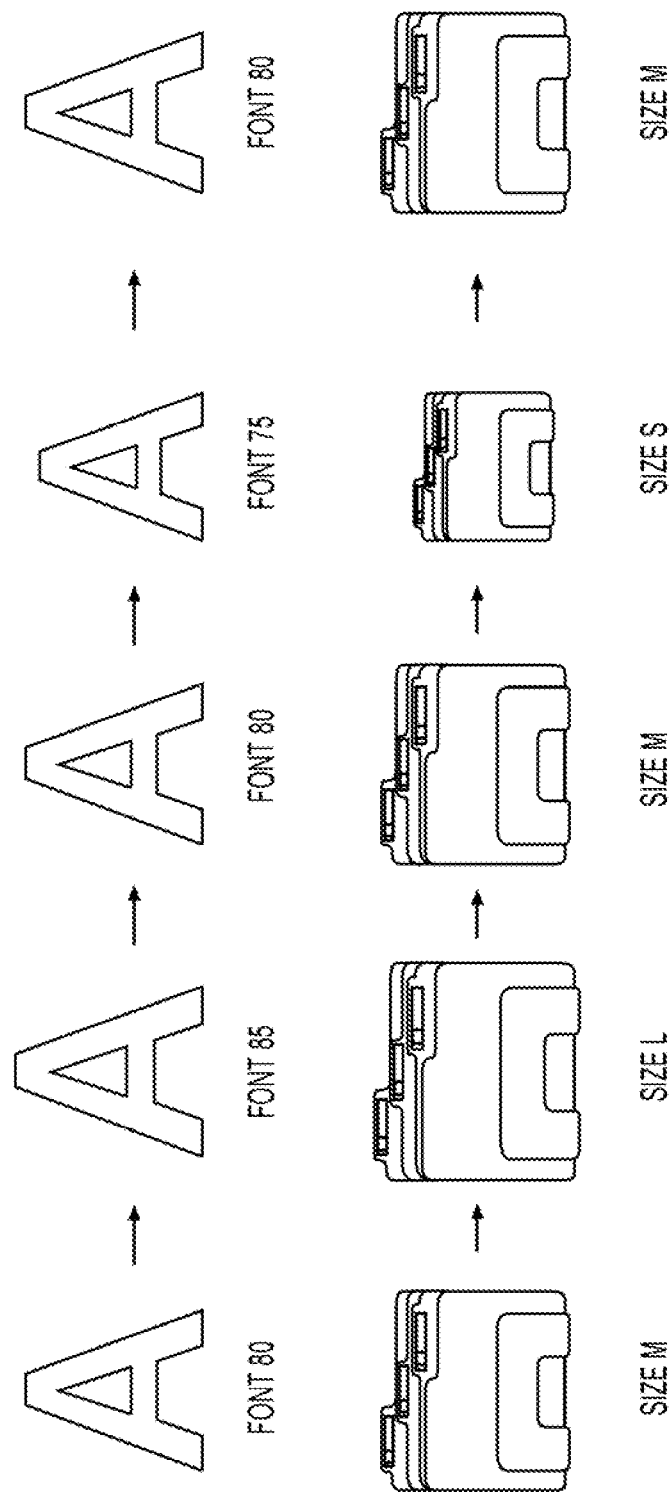
FIG. 3 is a diagram illustrating example methods for mitigating image degradation.

In another example, display policy 206 may provide information concerning: (1) at least one icon for display on the display, and (2) a schedule for changing a size of the at least one icon over a period of time. Thus, as shown in FIG. 3, after a time period provided by the display policy, the size of an icon, for example a file folder icon, may be varied from a medium size icon (Size M) to a large size (Size L). After another time period, the size of the folder icon may be changed to a medium size again and then after yet another time period, the size of the folder icon may be changed to a small size (Size S). Consistent with the schedule for changing the size of the icon provided by the display policy, after another time period, the size may be changed back to medium. Other changes to the size of the icon in a different sequence may be made. The changes may be made in a slowly varying pattern to ensure that the user is not distracted by such changes. Display policy may provide for the changes to occur when the display is not being used and may be in a standby mode. In one example, the file icon may include red pixels, green pixels, and blue pixels. Display pixel controller 230 may be configured to: (1) provide values corresponding to the red pixels to display 240, (2) provide values corresponding to the green pixels to display 240, and (3) provide values corresponding to the blue pixels to display 240. Image data adjuster 222 may be configured to at least: (1) modify at least one of the values corresponding to the red pixels, (2) modify at least one of the values corresponding to the green pixels, or (3) modify at least one of the values corresponding to the blue pixels to adjust the image data based on the display policy. Thus, in this example, the size of the icon may be modified by modifying the values corresponding to the pixels. Image data corresponding to the icon may be stored in image storage 220.

In yet another example, display policy 206 may provide information concerning a font size for a text element and a schedule for changing the font size over a period of time. Thus, as shown in FIG. 3, per the schedule provided by display policy, letter A initially may be displayed in font size 80. After a time period, the font size of letter A may be changed to font size 85. After another time period, the font size of letter A may be changed to font size 80. After a yet another time period, the font size of letter A may be changed to font size 75 and then after another time period the font size may be change to font size 80 again. In one example, as per the display policy, the font size of the letters may be changed based on a detected change in an application or software that is being used to display the image. In another example, as per the display policy, the font size of the letters may be changed based on the type of user, such as the ones discussed earlier. Image data adjuster 222 may make the changes to the size of the icon(s) and the font size of the letter(s). In one example, the icon and the font size of letters may further be adjusted based on the values corresponding to the contextual metrics discussed earlier. Thus, the display policy may provide multiple types of adjustments to the image data based on both contextual metrics and other policies associated with the usage of display 240. Although FIG. 2 shows a certain number of components of display system 200 arranged in a certain manner, there could be more or fewer number of components arranged differently. As an example, image data adjuster 222 may adjust the image data and the adjusted image data may be provided to image storage 220, which in turn may provide the adjusted image data to display pixel controller 230. In addition, the functionality contained in each of the components of display system 200 may be combined or separated into additional components.

Figure 4:
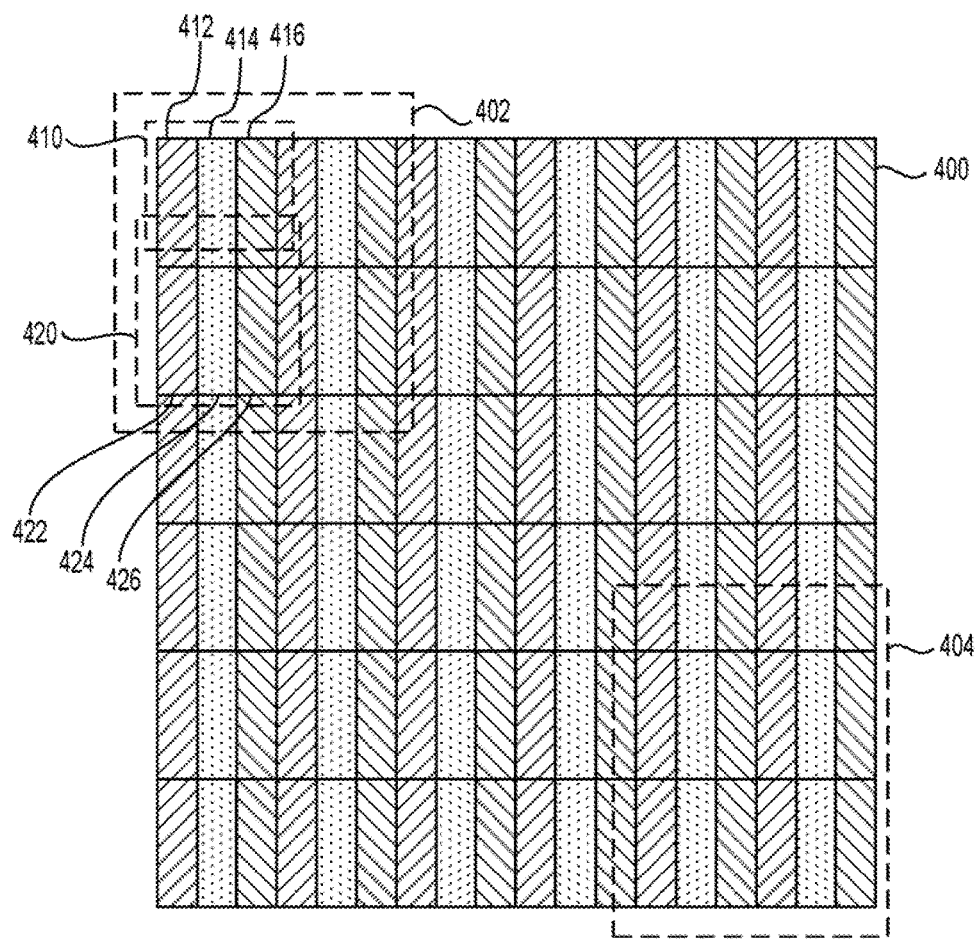
FIG. 4 is a diagram illustrating a method for mitigating image degradation in accordance with another example.

As discussed earlier, in certain types of displays, such as organic light emitting diode (OLED) displays, each pixel is driven individually. In other words, each pixel is provided a specific voltage or current value that determines the amount and the wavelength of emissions of photons from each pixel. Blue pixels have the highest energy density and the lowest wavelength among the three primary colors (red, green, and blue). As a result, blue pixels may degrade faster than the red pixels or the green pixels. This may cause problems, such as image sticking. Image sticking relates to image retention in certain portions of a display when a fixed pattern is displayed over a prolonged period of time on the display. Such image retention may result in shaded areas in certain portions of the display. As an example, a desktop icon that is always displayed at a particular location on the display may cause degradation of the image at that location. Such image degradation occurs from use over a prolonged period of time, such as from use over a few thousand hours. FIG. 4 is a diagram illustrating a method for mitigating image degradation in such displays in accordance with another example. An image 400 may comprise a number of red, green, and blue pixels. Thus, each pixel, such as pixel 410, may include a red pixel 412, a green pixel 414, and a blue pixel 416. Another adjacent pixel, such as pixel 420 may include a red pixel 422, a green pixel 424, and a blue pixel 426. When the color intensity index for blue pixels is significantly different for adjacent pixels, then that may increase the likelihood of image degradation. Thus, if blue pixel 416 has a color intensity index of 211 and if blue pixel 426 has a color intensity index of 178, then there may be a greater likelihood of a user noticing degradation as the blue pixels degrade unevenly over time. In one example, display policy may provide adjustments to the color intensity index of blue pixels that are adjacent to each other to mitigate image degradation. For example, if these blue pixels correspond to an icon (e.g., a file icon of FIG. 3), then the color intensity index of blue pixel 416 may be reduced to a lower value, for example, 198. The lower difference between the color intensity index may result in better performance of the display over time. Such adjustments may be made using display system 200, as discussed earlier. Moreover, the adjustments may be limited to specific portions of the display, such as portion 402, and no such adjustments may be made to other portions, such as portion 404.

Display policy 206 may provide other methods for mitigating degradation of a display. As one example, based on the distance from a user and the size of the display, the size of the icons may be made smaller resulting in less degradation. As another example, standard icons displayed by an operating system, such as the taskbar at the bottom of the screen may be modified. The operating system associated with a device coupled to the display may provide information concerning icons that are always displayed in the same location, such as the task bar at the bottom of the screen, the tool bar at the top of the screen, or other user interface elements at other locations that are always displayed in the same location. The display policy may provide for blurring of such icons to further mitigate image degradation. Icons may be blurred based on their location on the display. As an example, icons associated with a taskbar may be blurred by 10 percent to 30 percent. As discussed earlier, image data adjuster 222 (FIG. 2) may modify the pixel values corresponding to the pertinent icons based on the display policy. In addition, the refresh rate for certain portions of the display associated with such icons may also be changed. In another example, image data adjuster 222 may progressively decrease the contrast between persistent foreground objects, such as icons, taskbars, toolbars, and the respective background.

Figure 5:
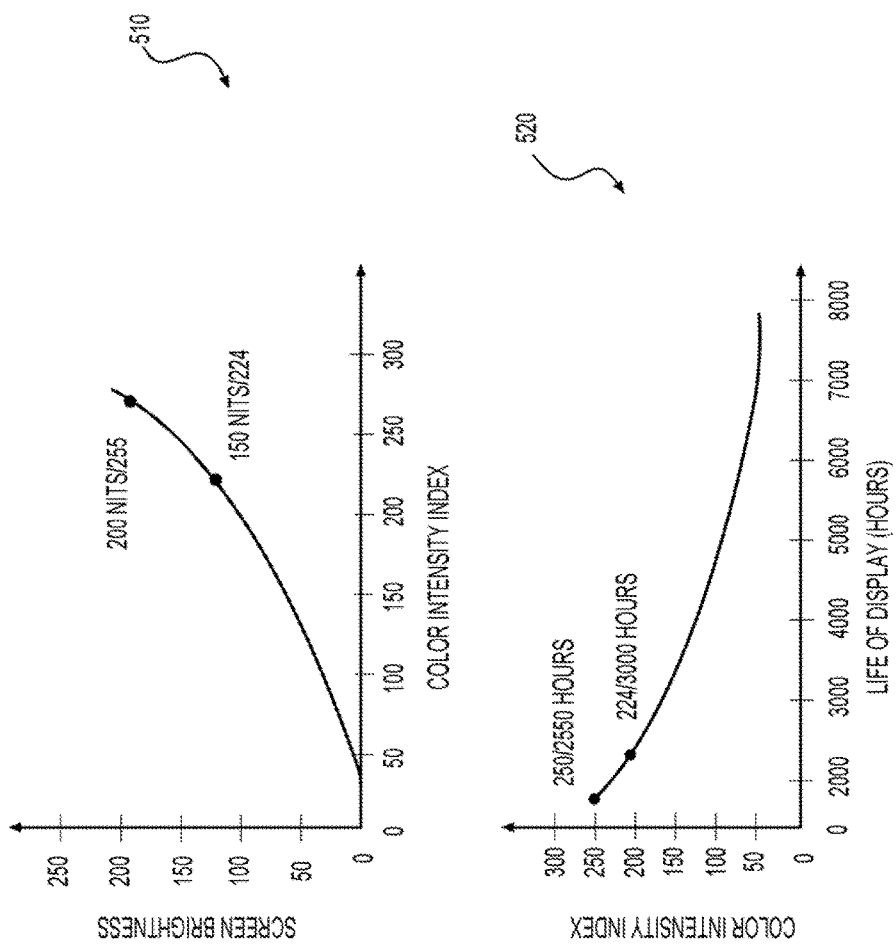
FIG. 5 is a diagram showing the effect of mitigation of image degradation in accordance with one example.

FIG. 5 is a diagram showing the effect of mitigation of image degradation in accordance with one example. In one example, the display policy may provide custom values for use with a display or a type of display. To generate the custom values, experimental data may be collected. As an example, a correlation between screen brightness (vertical axis of chart 510) and the color intensity index (horizontal axis of chart 510) may be obtained. Based on this correlation data, observations concerning the relationship between the screen brightness and the color intensity index for a particular display or a type of display may be obtained. As an example, as shown in chart 510, a reduction in brightness from 200 nits to 150 nits correlates to a reduction in the color intensity index from 255 to 224. As discussed earlier, the color intensity index may be a relative value of the intensity of the color for use by display pixel controller 230. A value of 255 for each of the red, green, and blue colors may represent full saturation for these color values. Having obtained the correlation data, the display policy may provide the desired color intensity index values. Furthermore, as shown in chart 520, a correlation between the color intensity index (vertical axis of chart 520) and the life of the display in hours (horizontal axis of chart 520) may also be obtained for a display or a type of display. As an example, as shown in chart 520, a reduction in the color intensity index value from 255 to 224 may result in an increase of the life of the display from 2,550 hours of use to 3,000 hours of use. The display policy may process this data and based on the desired outcome, the display policy may provide for appropriate color intensity index values.

Figure 6:
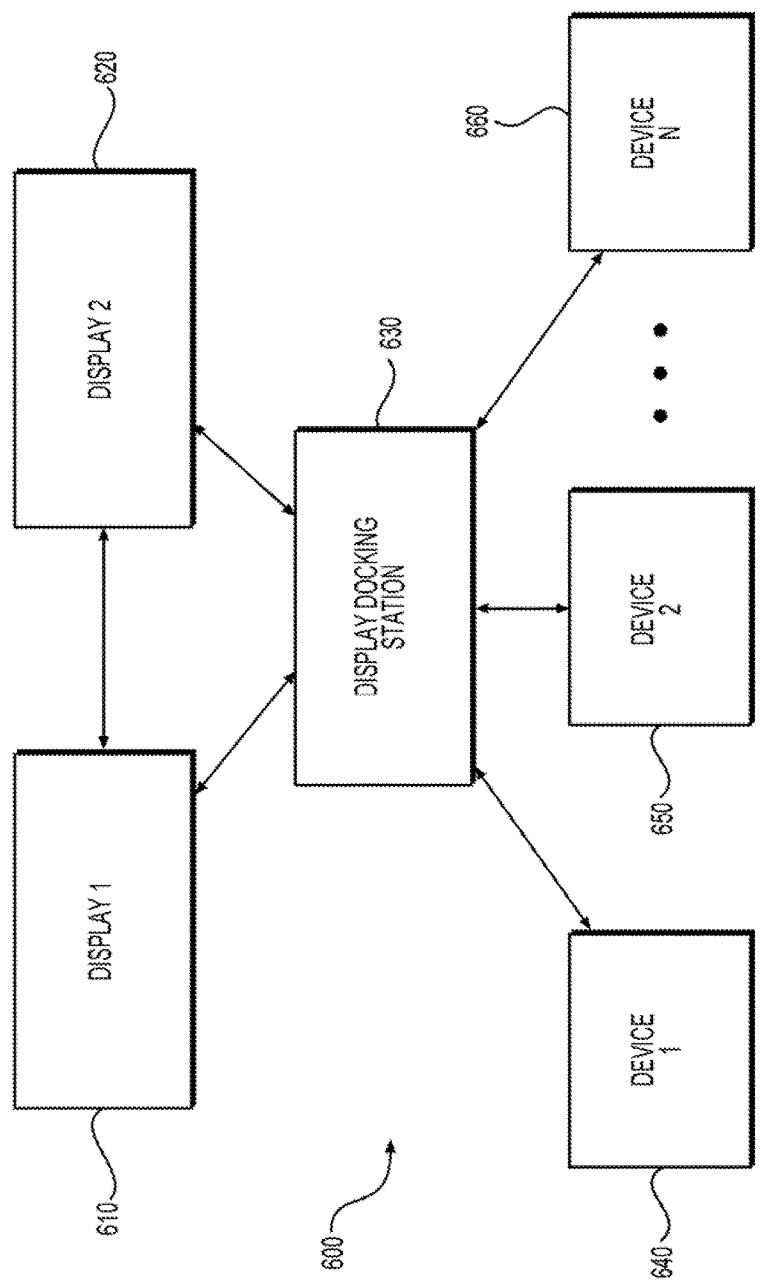
FIG. 6 is a diagram showing a system environment including multiple displays in accordance with one example.

FIG. 6 is a diagram showing a system environment 600 including multiple displays in accordance with one example. System environment 600 may include multiple displays (e.g., display 1 610 and display 2 620) coupled via a docking station 630 to various devices (e.g., device 1 640, device 2 650, and device N 660). In accordance with one method to mitigate image degradation, context detector may track usage of the displays over time. Docking station 630 or another controller may be configured to change at least one parameter associated with at least one of the first display or the second display based on both a display policy and the usage data. Based on a display policy or other instructions, when only one display is being used, docking station 630 may switch on the display that has been used less than the other display. Docking station 630 may include display policy, such as display policy 206, to make such adjustments. Display policy may include history of the types of devices that might have been coupled via docking station 630 to the displays. The types of devices, in turn, may be associated with the users. Based on the type of the device, docking station 630 may restrict a user to only one display or it may restrict a user to a lower resolution or brightness. In one example, the resolution of the display may be reduced by grouping the pixels together into groups of four or more. As discussed earlier, display policy may provide such information to an image data adjuster, such as image data adjuster 222. Thus, in one example, all or a subset of the components discussed earlier with respect to FIG. 2 may be incorporated as part of docking station 630 and/or display 1 610 and display 2 620. Using such a system, all or a subset of the previously discussed methods for mitigating image degradation may be applied in the context of system environment 600. In one example, sensors, such as image sensors, presence sensors, or other types of sensors, may detect that a device, such as device 1, corresponds to a mobile device (e.g., a mobile phone, tablet, or another type of mobile device). In one example, these sensors may be any of sensors 202 of FIG. 2. The type of the device may be detected as a user carrying the device approaches any of the displays shown in FIG. 7. The information regarding the type of the device may be processed by docking station 630 or another device that incorporates all or a subset of the components discussed earlier with respect to FIG. 2. Based on a display policy, docking station 630 may direct the output of the mobile device to the display (e.g., display 1 610) that has been used less than the other display. Alternatively, docking station 630 may provide the usage data associated with the displays (e.g., display 1 610 and display 2 620) to the mobile device and, based on a display policy, the mobile device may direct its output to the display that has been used less than the other display. The communication between the mobile device and the displays may occur via a wireless network, such as Wi-Fi, Bluetooth, or any other wireless protocol. Although FIG. 6 shows a certain number of components of system environment 600 arranged in a certain manner, there could be more or fewer number of components arranged differently. As an example, although FIG. 6 shows a docking station for connecting the displays to the devices, they may be connected using other means, such as via a display adapter for each of the displays. In addition, the displays may also communicate with each other via docking station 630 or via a wireless connection, such as Wi-Fi or Bluetooth.

Figure 7:
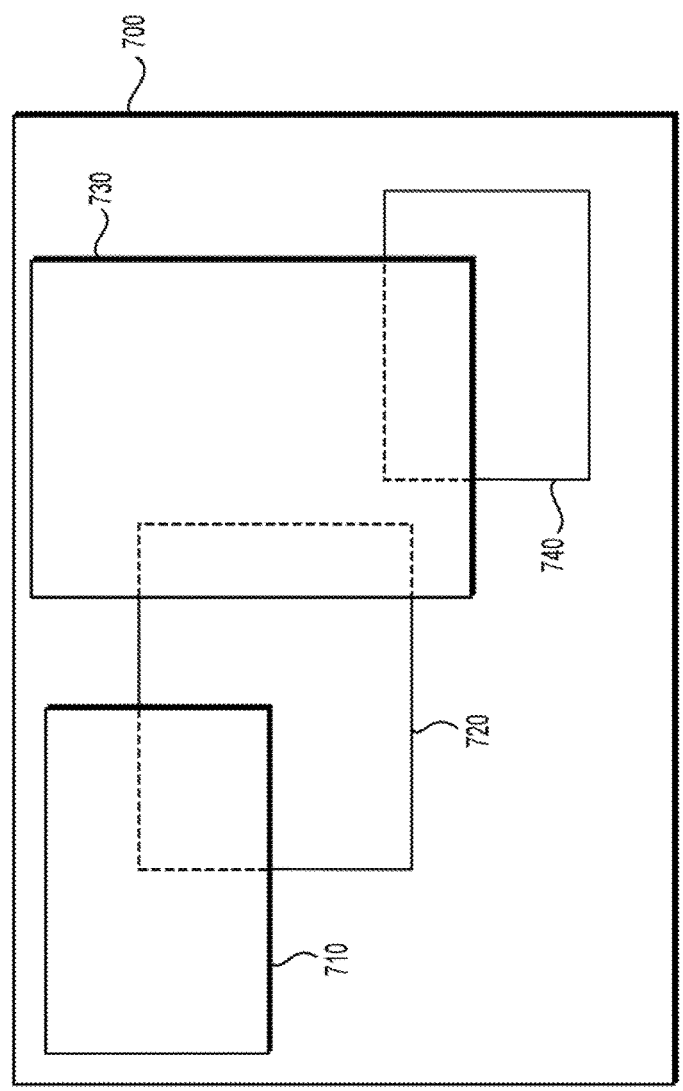
FIG. 7 is a diagram illustrating another method for mitigating image degradation in accordance with one example.

FIG. 7 is a diagram illustrating another method for mitigating image degradation in accordance with one example. This method may be performed by all or a subset of the components described with respect to FIG. 2. A display, such as display 240, may display multiple windows corresponding to the same application or different applications. The display policy may provide that only an active window be displayed at the highest resolution, whereas the inactive windows be displayed at a lower resolution. The display policy may also provide that only an active window be displayed at the highest brightness or contrast, whereas the inactive windows be displayed at a lower brightness or contrast. Other parameters associated with the display may also be specified by the display policy. As shown, in one example, display 700 may display four windows, where windows 710 and 730 may correspond to one application, window 720 may correspond to another application, and window 740 may correspond to yet another application. Image data adjuster 222 may adjust image data being displayed as per the display policy. In one example, image data adjuster 222 may receive a status of each window as being inactive or active from the operating system associated with display system 200. Image data adjuster 222 may also make such a determination with the help of a display controller by detecting a location of the cursor on the display. In another example, sensors 202 may be used for this purpose as well. For example, an eye-tracking sensor may detect the direction of the user's gaze and combine it with other information from the operating system to determine whether a particular window is active or inactive.

It is to be understood that the methods, modules, and information handling systems depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with the examples described in this disclosure can also include instructions stored in a non-transitory media, e.g., memory 104 or other types of non-transitory media. The term "non-transitory media" as used herein refers to any media storing data and/or instructions that cause a machine, such as information handling system 100, to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as DRAM, SRAM, a cache, or other such media. Non-transitory media is distinct from, but can be used in conjunction with, transmission media. Transmission media is used for transferring data and/or instruction to or from a machine, such as processor 102. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. An information handling system (IHS) comprising:
a display policy related to a display, wherein the display policy provides information concerning: (1) at least one icon for display on the display, and (2) a schedule for changing a size of the at least one icon over a period of time;

an image data storage configured to store image data corresponding to the at least one icon for the display; and an image data adjuster configured to adjust the image data corresponding to the at least one icon based on the display policy, wherein the at least one icon comprises a plurality of red pixels, a plurality of green pixels, and a plurality of blue pixels, and wherein the IHS further comprising a pixel controller configured to: (1) provide a plurality of values corresponding to the plurality of red pixels to the display, (2) provide a plurality of values corresponding to the plurality of green pixels to the display, and (3) provide a plurality of values corresponding to the plurality of blue pixels to the display.

2. The IHS of claim 1, wherein the image data adjuster is further configured to at least: (1) modify at least one of the plurality of values corresponding to the plurality of red pixels, (2) modify at least one of the plurality of values corresponding to the plurality of green pixels, or (3) modify at least one of the plurality of values corresponding to the plurality of blue pixels to adjust the image data based on the display policy.

3. The IHS of claim 1, wherein the image data storage is further configured to provide text image data corresponding to at least one text element having a font size, and wherein the image data adjuster is configured to adjust the font size of the at least one text element based on the display policy.

4. The IHS of claim 1, wherein the display is an organic light emitting display (OLED), and wherein the image data adjuster is configured to modify at least one of the plurality of values corresponding to only the plurality of blue pixels to adjust the image data based on the display policy.

5. The IHS of claim 1, wherein the schedule for changing the size of the at least one icon over a period of time comprises automatically: (1) changing the size of the at least one icon to a smaller size from an original size after an elapse of at least a first portion of the period of time, (2) maintaining the size of the at least one icon at the smaller size for at least a second portion of the period of time, and (3) changing the size of the at least one icon to the original size after an elapse of the second portion of the period of time.

6. An information handling system (IHS) comprising:
a display policy related to a display, wherein the display policy provides information concerning at least one contextual metric related to the display;
a context detector configured to detect at least one value corresponding to the at least one contextual metric related to the display;
an image data storage configured to store image data for the display; and
an image data adjuster configured to adjust the image data based on the at least one value corresponding to the at least one contextual metric related to the display, wherein the image data comprises: (1) a plurality of values corresponding to the plurality of red pixels to the display, (2) provide a plurality of values corresponding to the plurality of green pixels to the display, and (3) provide a plurality of values corresponding to the plurality of blue pixels to the display, and wherein the image data adjuster is further configured to at least: (1) modify at least one of the plurality of values corresponding to the plurality of red pixels, (2) modify at least one of the plurality of values corresponding to the plurality of green pixels, or (3) modify at least one of the plurality of values corresponding to the plurality of blue pixels to adjust the image data based on the at least one value corresponding to the at least one contextual metric related to the display.

7. The IHS of claim 6, wherein the contextual metric relates to at least one of a user type or a usage pattern associated with the display.

8. The IHS of claim 7, wherein the context detector is configured to detect the user type based at least on login information associated with a user.

9. The IHS of claim 7, wherein the context detector is configured to detect the usage pattern based at least on a pattern of use of a type of software by a user.

10. The IHS of claim 6, wherein the image data adjuster is further configured to modify at least one of the plurality of values corresponding to only the plurality of blue pixels to adjust the image data based on the at least one value corresponding to the at least one contextual metric related to the display.

11. The IHS of claim 6, wherein the display is an organic light emitting display (OLED), and wherein the image data adjuster is configured to modify at least one of a plurality of values corresponding to only a plurality of blue pixels to adjust the image data based on the display policy.

12. An information handling system (IHS) comprising:
a first display;
a second display;
a display policy related to the first display or the second display, wherein the display policy provides information concerning use of the first display and the second display;
a detector configured to generate usage data concerning use of the first display and use of the second display; and
a controller configured to change at least one parameter associated with at least one of the first display or the second display based on both the display policy and the usage data.

13. The IHS of claim 12, wherein the detector comprises a presence detector to detect a presence of a user in a vicinity of the at least the first display or the second display.

14. The IHS of claim 12, wherein the at least one parameter associated with the at least one of the first display or the second display includes at least one of a brightness, contrast, or another parameter related to an image displayed on the first display or the second display.

15. The IHS of claim 12, wherein the controller is further configured to switch an image being displayed from the first display to the second display based on the display policy.

16. The IHS of claim 12, wherein each of the at least the first display or the second display is configured to display a plurality of windows corresponding to a plurality of applications, and wherein the controller is further configured to detect an active window from among the plurality of windows, and wherein the controller is further configured to change at least one display parameter associated with the active window relative to at least one of a remaining set of the plurality of windows.

17. The IHS of claim 12, wherein the display policy further includes information concerning: (1) at least one icon for display on the at least the first display or the second display, and (2) a schedule for changing a size of the at least one icon over a period of time, further comprising:
an image data storage configured to provide image data corresponding to the at least one icon to the at least the first display or the second display; and an image data adjuster configured to, before providing the image data corresponding to the at least one icon to the at least the first display or the second display, adjust the image data based on the display policy.

18. The IHS of claim 12, wherein the display policy further includes information concerning at least one contextual metric related to the at least the first display or the second display, further comprising:

a context detector configured to detect at least one value corresponding to the at least one contextual metric related to the at least the first display or the second display;

an image data storage configured to provide image data to the at least the first display or the second display; and an image data adjuster configured to, before providing the image data to the at least the first display or the second display, adjust the image data based on the at least one value corresponding to the at least one contextual metric related to the at least the first display or the second display.

* * * * *